Aug. 4, 1925.                                                1,548,353
E. W. DAY

MAGNETIC COMPASS ROSE

Filed Aug. 6, 1918

INVENTOR
Edwin W. Day
BY Herbert H. Thompson
his ATTORNEY

Patented Aug. 4, 1925.

1,548,353

UNITED STATES PATENT OFFICE.

EDWIN W. DAY, OF BROOKLYN, NEW YORK, ASSIGNOR, BY MESNE ASSIGNMENTS, TO THE LAWRENCE SPERRY AIRCRAFT CO., INC., OF FARMINGDALE, LONG ISLAND, NEW YORK, A CORPORATION OF NEW YORK.

MAGNETIC COMPASS ROSE.

Application filed August 6, 1918. Serial No. 248,611.

*To all whom it may concern:*

Be it known that I, EDWIN W. DAY, a citizen of the United States, residing at 273 89th Street, borough of Brooklyn, city of New York, in the county of Kings and State of New York, have invented certain new and useful Improvements in Magnetic Compass Roses, of which the following is a specification.

This invention relates to magnetic compasses, and more specifically to the compass card or rose and to the method of manufacturing and assembling the same.

The principal object of the invention is to provide a compass rose which may be quickly and cheaply manufactured and assembled in large quantities.

Another object is to obviate the use of solder in a compass rose of this type.

Referring to the drawings wherein I have shown what I now consider to be the preferred form of my invention:

Figure 1:
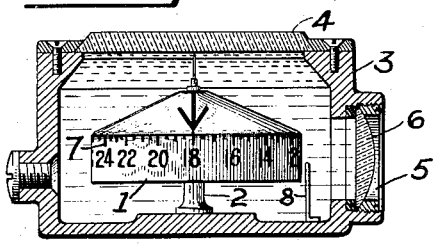
Fig. 1 is a side elevation partly in section of a compass embodying my invention.

In the drawings the compass card or rose 1 is shown pivotally mounted on a post 2 within a casing 3. The casing is shown as provided with a glass top 4 and a window 5 having a lens 6 in its side so that the compass rose may be read either from above or from the side.

Figure 3:
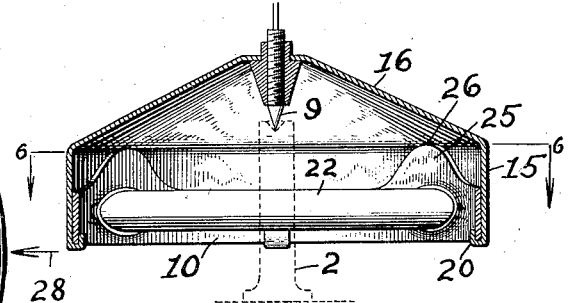
Fig. 3 is a section of the rose taken on line 3—3 of Fig. 2.
Figure 4:
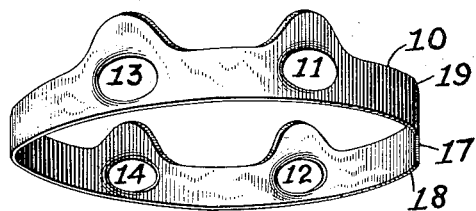
Fig. 4 is a view of a band used to support the magnets within the rose.

In Fig. 3 the rose is shown in section, showing the pivot 9 reaching downwardly from the top thereof and resting in the top of post 2.

The shell of the rose may be substantially dome-shaped, or more specifically, the sides 15 may be substantially cylindrical or annular as shown, while the top 16 may slope upwardly toward its center or by any suitable dome-shaped construction. A scale 7 is shown on the side 15 for side reading and an arrow 29 and the letter S on the top 16 for top reading. The rose is preferably made of sheet brass silver plated. If solder is used for securing the magnets in place it will form a chemical combination with the other metals which will dissolve or deposit in the liquid within the compass in the form of a lead oxide. This deposits on the card causing discoloring so that the elimination of the use of solder in this connection overcomes a serious difficulty in the art. It should be noted that the indicia of direction on the side 15 of the compass rose are opposite to such indicia 29 on the top thereof. In other words, although on the top of the card the northsouth indications are placed in the usual manner, i. e., with the north mark at the north poles of the magnets on the side of the card the graduations are 180° or opposite to the graduations on the top of the card, so that instead of the marking zero being at the north point, the mark 18 is at this point indicating 180°. The purpose of this is apparent when it is considered that this compass is used as a "marching compass"—in other words, to show the observer in what direction to head in order to reach any desired point. If the graduations were placed on the side as on the top of the card, the observer would be misled, since when looking due north, for instance, the compass card would show him that he was looking south because he would be looking at the south poles of the magnets and the south end of the card. However, by making the graduations opposite as explained, he is shown at once the direction in which he is looking.

A band 10 provided with preferably two pairs of oppositely disposed holes 11—12 and 13—14 is shown fitting snugly around the inside of the wall 15. The said band may be open on one side as at 17, and provided with a tendency to expand to a diameter greater than the diameter of the rose, and the two ends 18 and 19 may be overlapped when inserting the band in the rose and allowed to spring outwardly and end to end as at 17' shown by the dotted lines in Fig. 2, so that the band will press outwardly and firmly against the walls of the rose.

Small projections 20 on the rose may be bent over the band 10 to hold it rigidly in place. The band 10 may be comparatively narrow, and provided with projections 25 which may butt against the top portion 16 at 26 to prevent sliding up and down of the band. An additional purpose of projections 25 is to provide sufficient stock through which to cut the magnet holes.

Figure 2:
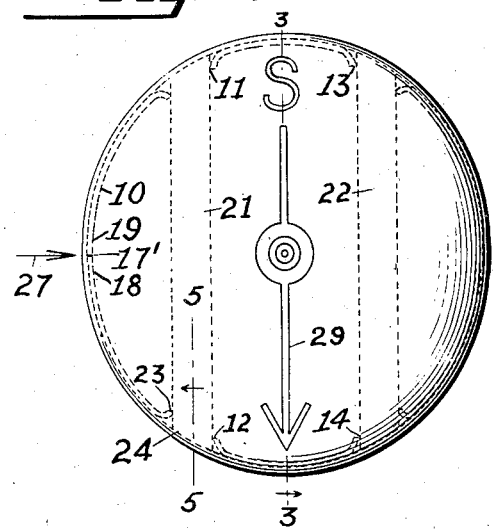
Fig. 2 is a top view of the compass rose.
Figure 5:
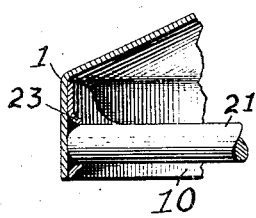
Fig. 5 is a detail partly in section taken approximately on line 5—5 of Fig. 2.

As shown in Fig. 3 and by the dotted lines in Fig. 2, magnets 21 and 22 are supported by band 10 within holes 11—12 and 13—14; the ends of the magnets abutting against wall 15. The material constituting the edges of holes 11—12 and 13—14 may be made to flare inwardly as shown at 23 in Figs. 5 and 2 for the purpose of forming a more substantial retainer for the magnets.

Figure 6:
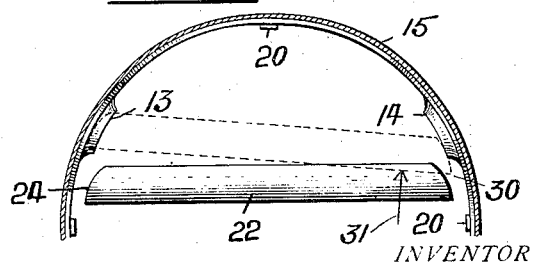
Fig. 6 is a sectional detail taken approximately on line 6—6, Fig. 3, but showing the magnet disengaged from its sockets.

The ends of the magnets 21 and 22 may be cut diagonally so as to conform substantially to the shape of the compass rose as shown at 24, Figs. 2 and 6.

In assembling the band 10 and the magnets within the compass rose, I prefer to first fit band 10 into the rose, pressing lugs 20 over it very lightly so that the band may still be moved rotatably within the rose for the final truing up of the compass. The magnets may then be inserted by pressing inwardly on opposite sides of the rose as indicated by arrows 27—28, thus elongating the rose and band 10 in the direction corresponding with the longitudinal direction of the magnets, thus spreading the opposite sockets, and then snapping each magnet into place and allowing the rose to spring back into shape. Or as shown in Fig. 6, one end of the magnet may be placed in its socket 13 as shown by the dotted lines, while the other end 30 is placed adjacent its socket 14. Pressure against the magnet as indicated by arrow 31 will now, because of the diagonal cut of the magnet, cause the sockets to spread and permit the magnet to snap into place. The parts are assembled with the magnets in their approximately correct position, after which the unit may be tested and corrections made if necessary, by rotating the band 10 within the rose until the arrow 29 on the top thereof points in the proper direction. The cleats 20 may then be clinched to prevent further movement of the said band.

Among the advantages gained by my invention are simplicity and cheapness of construction and assembly of the parts, as well as the absence of solder. It has been found to be a great advantage to construct the parts without the use of solder, not only because of the saving in time and cost, but also because of the prolongation effected in the life of the luminous paint used on the interior walls of the compass casing or on the scale and other markings on the compass card, for it has been found that the liquid used in such compasses to dampen the oscillations of the card, will, when it has solder to act upon, cause a much more rapid deterioration of such luminous material.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined; and the invention extends to such use.

Having described my invention, what I claim and desire to secure by Letters Patent is:

1. In a compass rose, a substantially dome-shaped member, a pivot attached thereto, a band within said member and a magnet supported by said band.

2. In a compass rose, a substantially dome-shaped member, a pivot attached thereto, a band within said member and embraced thereby, and a plurality of magnets supported by said band.

3. In a compass rose, a substantially dome-shaped member, a pivot attached thereto, a band within said member and embraced thereby, a pair of oppositely disposed holes being provided in said band and a magnet extending between and supported within said holes.

4. In a compass card, an annular member, means for pivotally supporting said member, a band within said member having a plurality of pairs of oppositely disposed holes for forming sockets in connection with said member and magnets supported by said sockets.

5. A compass rose comprising an annular member, means for pivotally supporting said member, a band within said member and supported thereby, said band being so designed as to form sockets in conjunction with said member, and a magnet supported within said sockets 6. A compass rose comprising an annular member, means for pivotally supporting said member, means within said member and supported thereby, said second mentioned means being so designed as to form sockets in conjunction with said member, and a magnet supported within said sockets.

7. A compass rose comprising an annular member, means for pivotally supporting said member, a band within said member and supported thereby, said band being so designed as to form sockets in conjunction with said member, a magnet supported within said sockets and means for securing said band to said member.

8. A compass rose comprising an annular member, means for pivotally supporting said member, means within said member and supported thereby, said second mentioned means being so designed as to form sockets in conjunction with said member, a magnet supported within said sockets, said second mentioned means being adapted to be rotated within said member and means for locking said second mentioned means against said rotation.

9. In combination, a compass card having annular sides, pivotal supporting means therefor, means associated with said sides and adapted to form oppositely disposed sockets in conjunction therewith, and a magnet adapted to fit within said sockets, said means being adapted to spread apart to permit said magnet to be snapped into place.

10. In combination, a compass card having annular sides, a band within said sides and supported thereby, said band being provided with holes therethrough with flaring or flange-like sides therearound and magnets supported within said holes.

11. The method of assembling a compass rose, comprising a rose shell and a resilient ring having sockets at opposite points for a magnet, said method consisting in compressing said ring on a diameter at an angle to a line connecting said sockets, slipping a magnet into said sockets and allowing said ring to reassume its normal position within the rose shell.

12. The method of assembling a compass rose, comprising a rose shell and a resilient ring having diagonally disposed sockets at opposite points for a magnet, said method consisting in pressing between said sockets a magnet having its ends cut diagonally, thus spreading said sockets and permitting said magnet to slip into said sockets.

13. The method of assembling a compass rose, comprising a rose shell and a resilient ring having sockets at opposite points, at least one of which sockets is diagonally disposed with respect to a line passing through said sockets, said method consisting in pressing a magnet having at least one end diagonally cut between said sockets for spreading the latter apart and permitting said magnet to slip into said sockets.

14. In combination, a compass card having annular sides, a member within said sides and forming sockets in connection therewith and magnets having their ends cut diagonally supported within said sockets.

15. In a side reading compass, a casing, a supporting post and a compass rose mounted thereon comprising a pivot pin, an outwardly and downwardly extending portion, a cylindrical portion having side reading graduations and forming an annulus, and a magnet extending across said annulus.

16. The method of assembling and truing a compass rose, which includes a rose shell, a ring like magnet holder, and a magnet, which method comprises inserting a magnet holder having sockets in the rose shell, securing the same lightly therein, springing a magnet into said sockets, adjusting the holder to properly position the magnet with respect to the shell and rigidly securing the holder to the shell.

In testimony whereof I have affixed my signature.

EDWIN W. DAY.